United States Patent
Balaraman et al.

(10) Patent No.: US 11,443,025 B2
(45) Date of Patent: *Sep. 13, 2022

(54) SINGLE SIGN-ON SOLUTION USING BLOCKCHAIN

(71) Applicant: AMERICAN EXPRESS TRAVEL RELATED SERVICES COMPANY, INC., New York, NY (US)

(72) Inventors: Balaji Balaraman, Bangalore (IN); Andras L. Ferenczi, Peoria, AZ (US); Dallas L. Gale, Scottsdale, AZ (US); Nilesh Yashavant Jadhav, Phoenix, AZ (US); Harish R. Naik, Phoenix, AZ (US)

(73) Assignee: AMERICAN EXPRESS TRAVEL RELATED SERVICES COMPANY, INC, New York, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/836,166

(22) Filed: Mar. 31, 2020

(65) Prior Publication Data
US 2020/0226242 A1    Jul. 16, 2020

Related U.S. Application Data

(63) Continuation of application No. 15/824,450, filed on Nov. 28, 2017, now Pat. No. 10,642,967.

(51) Int. Cl.
G06F 21/41        (2013.01)
H04L 29/06        (2006.01)
(Continued)

(52) U.S. Cl.
CPC .............. G06F 21/41 (2013.01); G06F 16/27 (2019.01); G06F 16/958 (2019.01);
(Continued)

(58) Field of Classification Search
CPC ........ G06F 21/41; G06F 16/27; G06F 16/958; H04L 9/0637; H04L 9/3213;
(Continued)

(56) References Cited

U.S. PATENT DOCUMENTS

2011/0314532 A1*  12/2011  Austin ................ H04L 63/0892
                                                         726/8
2012/0110651 A1*   5/2012  Van Biljon ......... G06F 21/6218
                                                         709/201

(Continued)

OTHER PUBLICATIONS

International Search Report and Written Opinion dated Jan. 16, 2019 in PCT Application No. PCT/US2018/059665.
European Search Report in related, co-pending Application No. EP 18884655.4, dated Jul. 1, 2021.

*Primary Examiner* — Yonas A Bayou
(74) *Attorney, Agent, or Firm* — Thomas | Horstemeyer, LLP

(57) ABSTRACT

A single sign-on system using blockchain is disclosed. The single sign-on system may interconnect various organization systems over a peer-to-peer network, with each organization system having a blockchain node and an application programming interface (API). The blockchain node invokes and uses a smart contract to write registration credentials to the blockchain during a registration process. During a login process, the blockchain node invokes the smart contract to determine whether login credentials match stored login credentials in the blockchain. In response to matching login credentials, the API may generate a single sign-on token that can be used by a user device to access one or more organization systems connected over the network.

20 Claims, 7 Drawing Sheets

(51) Int. Cl.
*H04L 9/06* (2006.01)
*H04L 9/32* (2006.01)
*G06F 16/27* (2019.01)
*G06F 16/958* (2019.01)
*H04L 9/40* (2022.01)
*H04L 9/00* (2022.01)

(52) U.S. Cl.
CPC .......... *H04L 9/0637* (2013.01); *H04L 9/3213* (2013.01); *H04L 9/3226* (2013.01); *H04L 9/3239* (2013.01); *H04L 63/061* (2013.01); *H04L 63/0815* (2013.01); *H04L 9/50* (2022.05); *H04L 63/12* (2013.01)

(58) Field of Classification Search
CPC ... H04L 9/3226; H04L 9/3239; H04L 63/061; H04L 63/0815; H04L 63/12; H04L 2209/38
See application file for complete search history.

(56) References Cited

U.S. PATENT DOCUMENTS

| | | | |
|---|---|---|---|
| 2013/0247142 A1* | 9/2013 | Nishizawa | H04L 63/08 726/1 |
| 2015/0121500 A1* | 4/2015 | Venkatanaranappa | H04L 63/0815 726/8 |
| 2016/0283941 A1* | 9/2016 | Andrade | G06Q 20/3829 |
| 2016/0330034 A1* | 11/2016 | Back | G06Q 40/12 |
| 2017/0077855 A1 | 3/2017 | Lai | |
| 2017/0149560 A1* | 5/2017 | Shah | G06K 7/1417 |
| 2017/0300928 A1* | 10/2017 | Radocchia | H04W 12/06 |
| 2017/0330179 A1* | 11/2017 | Song | G06Q 20/3829 |
| 2018/0068130 A1* | 3/2018 | Chan | G06F 21/606 |
| 2019/0036696 A1* | 1/2019 | Anglin | H04L 9/3236 |
| 2019/0080392 A1* | 3/2019 | Youb | G06Q 20/401 |
| 2019/0108542 A1* | 4/2019 | Durvasula | G06Q 20/065 |

* cited by examiner

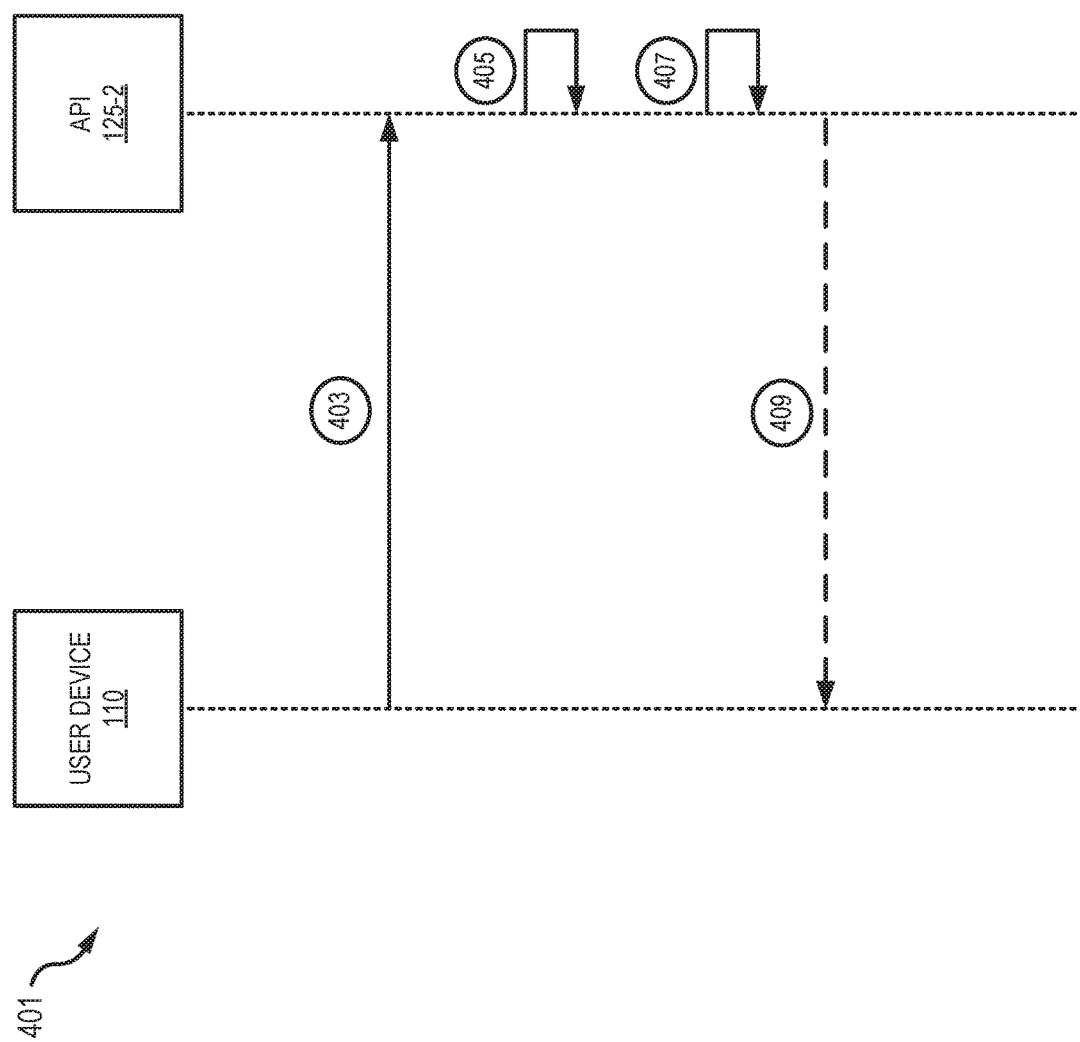

SINGLE SIGN-ON SOLUTION USING BLOCKCHAIN

CLAIM OF PRIORITY

This application is a continuation application of and claims priority to U.S. application Ser. No. 15/824,450, filed Nov. 28, 2017, entitled "SINGLE SIGN-ON SOLUTION USING BLOCKCHAIN", which application is entirely incorporated herein by reference.

FIELD

This disclosure generally relates to single sign-on, and more particularly, to systems and methods for single sign-on using a distributed database.

BACKGROUND

Single sign-on solutions allow users to access multiple related, yet independent, software systems by providing a single login credential (e.g., a user ID and password). The single sign-on service authenticates the user for websites, applications, software systems, or the like that are integrated into the same single sign-on service. The single sign-on service eliminates further login prompts when the user navigates to different websites, applications, software systems, etc. during the same login session. Technical problems may arise when scaling single sign-on solutions to new technologies and/or software systems. For example, implementing new technologies and/or software systems into the same single sign-on solution may require integrating various entities and technologies into the same infrastructure. As the amount of systems and technologies implemented into the same single sign-on solution expand, the costs, system architecture, and supporting software associated with the single sign-on solution increases.

SUMMARY

A system, method, and computer readable medium (collectively, the "system") is disclosed for single sign-on using blockchain. The system receives a registration request comprising a registration credential. The system invokes and uses a smart contract to determine whether the registration credential exists in a blockchain on a blockchain node. The system writes the registration credential to the blockchain in response to determining that the registration credential did not exist in the blockchain. The system propagates the registration credential to at least a second blockchain node in the peer-to-peer network for writing to the blockchain.

In various embodiments, the system generates a hash password based on the registration credential, wherein the smart contract determines whether the registration credential exists in the blockchain by searching the blockchain based on the hash password and the registration credential.

In various embodiments, the system receives a login credential and invokes and uses the smart contract to determine whether the login credential matches a stored login credential in the blockchain on the blockchain node. The system generates a hash login password based on the login credential, wherein the smart contract determines whether the login credential matches the stored login credential in the blockchain by comparing the hash login password to a stored hash login password. The system generates a single sign-on token based on the login credential in response to the login credential matching the stored login credential. The system transmits the single sign-on token to a user device, wherein in response to receiving the single sign-on token the user device is granted access to systems in the peer-to-peer network. The system receives an access request from the user device, wherein the access request comprises the single sign-on token, and transmits single sign-on token to authorize the access request from the user device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIGS. 4A and 4B illustrate a system process flow for passing a single sign-on token to access a second software system, in accordance with various embodiments.

DETAILED DESCRIPTION

Figure 1:
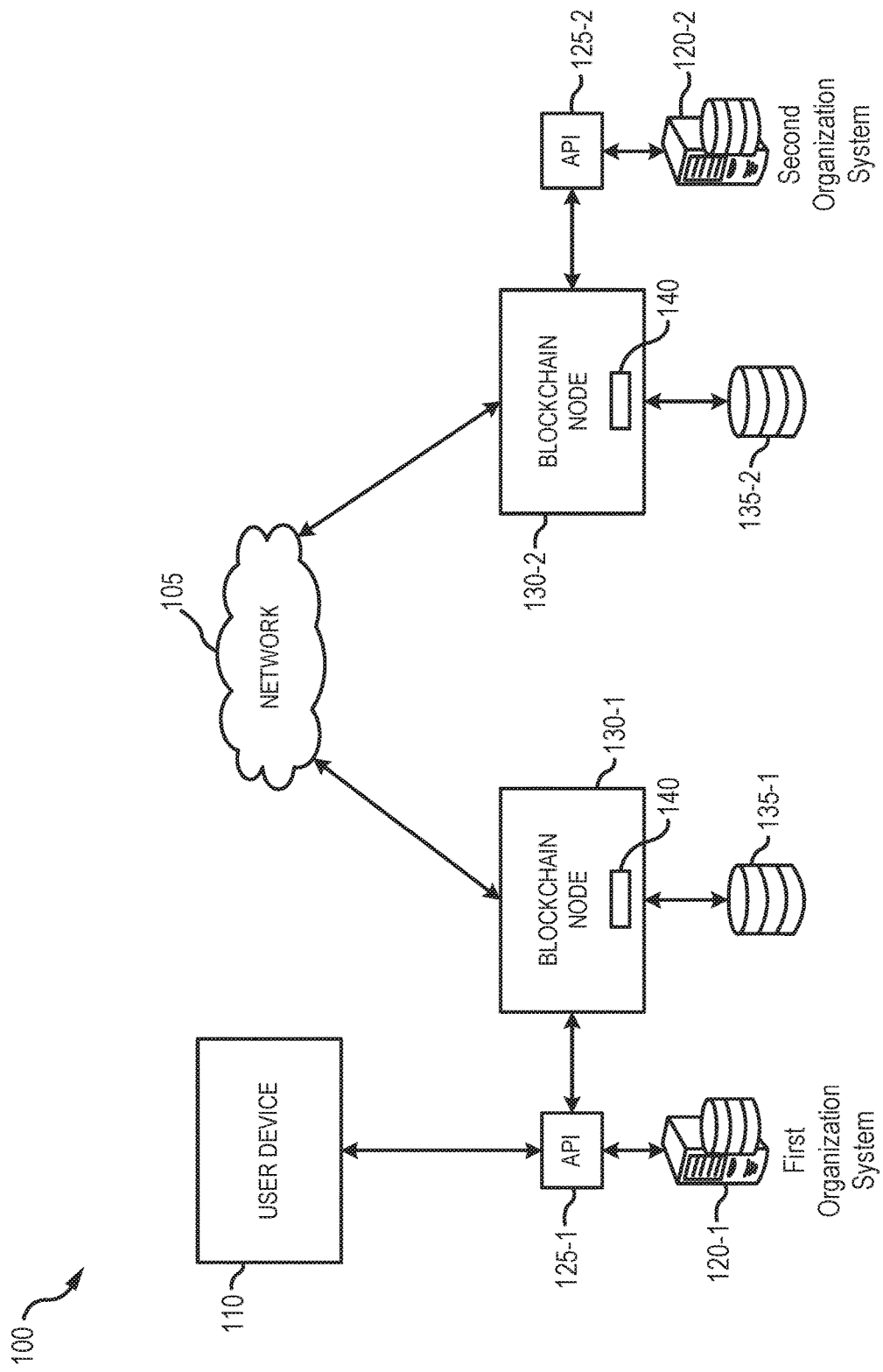
FIG. 1 illustrates an exemplary system for single sign-on using blockchain, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A single sign-on system based on peer-to-peer transactions may be used to facilitate any type of single-sign on without (or with minimal) third party intervention and/or expanded system architecture. For example, a blockchain driven peer-to-peer single sign-on of the present disclosure may allow organizations to leverage a single solution to verify user identity, without the need to integrate with third party solutions such as OAuth, OpenID®, Open ID® Connect, FACEBOOK® Connect, and/or similar authentication solutions. The blockchain driven peer-to-peer network may also enable instant or near-instant registration, validation, and authorization of single sign-on registrations and logins, as discussed further herein. For a blockchain-based peer-topeer single sign-on system, a governing organization or consortium may control access to data stored on the blockchain. Registration with the managing organization(s) may enable participation in the single sign-on network.

The single sign-on systems and methods described herein may use a distributed database, which may be based on a blockchain and have consensus based validation. The single sign-on systems and methods may integrate smart contracts that enforce single sign-on registration and login workflows in a decentralized manner, and manage, validate, and keep track of registered user credentials and passwords (e.g., crypto-hashes of user passwords). The single sign-on systems and methods may also include applications deployed on user devices such as, for example, computers, tablets, smartphones, Internet of Things devices (IoT devices), etc. The applications may communicate with the blockchain to register user identifiers and passwords for use in the single sign-on solution, and to access, validate, and authorize the user identifiers and passwords during a single sign-on login process.

The system further improves the functioning of the computer and/or networked environment. For example, by automating and providing instant or near-instant single sign-on validations, registrations, and logins, as opposed to needing a user, third party, or the like to provide single sign-on services and authentications, the user performs less computer functions and provides less input, which saves on data storage and memory, thus speeding processing in the computer and/or networked environment. The system may also provide scaling capabilities to allow any third-party, external, or internal platform or system to leverage the solution with minimal integration effort. For example, any product, platform, system, or the like that leverages blockchain may natively use the smart contract based on single-sign, as discussed further herein, instead of needing to integrate into another product or network.

Single sign-on registrations performed through the system will propagate to all connected peers within the network within a duration that may be determined by the block creation time of the specific blockchain technology implemented. For example, on an Ethereum-based network, a new registration will become available within about 15 to about 20 seconds as of this writing. On a Hyperledger Fabric 1.0 based platform, the duration is driven by the specific consensus algorithm that is chosen, and may be performed within seconds. In that respect, propagation times in the system may be improved compared to existing single sign-on products, and implementation costs and time to market may also be drastically reduced. The system also offers increased security at least partially due to the immutable nature of transactional data that is stored in its distributed ledger, reducing the probability of tampering with stored registration data.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, data for storage, and the like in digital or any other form.

With reference to FIG. 1, a single sign-on system 100 is depicted according to various embodiments. Single sign-on system 100 may include various computing devices, software modules, networks, and data structures in communication with one another. Single sign-on system 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. Single sign-on system 100 based on a blockchain, as described herein, may simplify single sign-on operations by using the blockchain as a distributed and tamper-proof data store and providing a simplified system architecture. The verification process for a single sign-on may be near-instant. Transparency is very high for various embodiments using a consortium or public blockchain since validation is performed, for example, using data stored by a decentralized autonomous organization (DAO) instead of a specific financial institution.

System 100 may comprise one or more organization systems 120 in logical communication with each other via a peer-to-peer network 105, as discussed further herein. First organization system 120-1 and/or second organization system 120-2 may include at least one computing device in the form of a computer or processor, or a set of computers/ processors, although other types of computing units or systems may be used, such as, for example, a server, web server, pooled servers, or the like. Each organization system 120 may run applications to interact with the blockchain 140, via blockchain nodes 130, transfer files over a network with other computing devices, perform crypto operations, and otherwise operate within system 100. A blockchain address may be uniquely assigned to each organization system 120 to function as a unique identifier for each respective organization system 120. Although the present disclosure makes reference to first organization system 120-1 and second organization system 120-2, it should be understood that principles of the present disclosure may be applied to a single sign-on system having any suitable number of interconnected organization systems, and the blockchain-based single sign-on solution may be scaled to connect any suitable or desired number of organization systems.

In various embodiments, system 100 may comprise a user device 110. User device 110 may comprise any suitable combination of hardware and/or software and may be a computing device such as a server, laptop, notebook, hand held computer, personal digital assistant, cellular phone, smart phone (e.g., iPhone®, BlackBerry®, Android®, etc.) tablet, wearable (e.g., smart watches, smart glasses, smart rings, etc.), Internet of things (IoT) device, smart speaker, or any other device capable of interacting with one or more APIs 125. User device 110 may be in electronic communication with one or more organization systems 120 via a corresponding application programming interface (API) 125. In that regard, a user may interact with user device 110 to access one or more organization systems 120, via the corresponding API 125. For example, a user may transmit registration requests and login requests to APIs 125, and may interact with APIs 125 to access one or more organization systems 120, as discussed further herein. API 125-1, and 125-2 may run in each respective organization system 120 within a secure environment in a data center, cloud storage, or the like. API 125-1 may be in electronic communication with blockchain node 130-1. API 125-2 may be in electronic communication with blockchain node 130-2.

Each organization system 120 may comprise and/or be in electronic communication, via API 125, with a blockchain node 130 (e.g., first organization system 120-1 comprises or is in electronic communication with blockchain node 130-1, and second organization system 120-2 comprises or is in electronic communication with blockchain node 130-2). Blockchain nodes 130 may maintain copies of blockchain 140 and validate new writes to blockchain 140. Blockchain nodes 130 interface with outside applications and computing devices (e.g., first organization system 120-1, second organization system 120-2, and/or user device 110) using API 125 (e.g., API 125-1 or API 125-2) such as, for example, a web3 API compatible with the blockchain maintained by the Ethereum® consortium. Blockchain nodes 130 may be configured to add data to blockchain 140 in response to API calls from API 125 that invoke and use a smart contract 135. Smart contract 135 may be an executable that writes data to blockchain 140 in a predetermined format based on predetermined function parameters passed by an API call. Smart contract 135 may take as an input the fields included for writing during the registration process or login process, such as, for example, a user ID, a password, a hash password, a biometric input, or the like.

In various embodiments, each blockchain node 130 may host smart contracts 135 that autonomously govern the logging and/or validation of registration credentials by supporting execution and/or recording of data. Each smart contract 135 controls the end-to-end flow of the system. For example, and as discussed further herein, each smart contract 135 may be configured to control the process of searching for, registering, and/or propagating to blockchain 140 user credentials during a registration process; validating received login credentials by matching the login credential against stored login credentials; and generating and/or transmitting various statuses, confirmations, or the like. Smart contract 135 may also be configured to store and maintain a stored data map comprising stored registration data or metadata indicating the position of stored registration data in blockchain 140. In various embodiments, smart contract 135 may be configured to store and maintain the stored registration data along with the stored data map. In various embodiments, smart contract 135 may also be configured to write the stored registration data to blockchain 140, as discussed further herein. Smart contract 135 may include a program written in a programming language such as, for example, Solidity, or any other suitable programming language.

Blockchain 140 may be a distributed database that maintains records in a readable manner and that is resistant to tampering. Blockchain 140 may be based on blockchain technologies such as, for example, Ethereum, Open Chain, Chain Open Standard, Hyperledger Fabric, etc. Blockchain 140 may comprise a system of interconnected blocks containing data. The blocks can hold registration credentials and/or other information as desired. Each block may link to the previous block and may include a timestamp. When implemented in support of system 100, blockchain 140 may serve as an immutable log for single sign-on registration credentials. Blockchain 140 may be a peer-to-peer network that is private, consortium and/or public in nature (e.g., Ethereum, Bitcoin, Hyperledger Fabric, etc.). Consortium and private networks may offer improved control over the content of blockchain 140 and public networks may leverage the cumulative computing power of the network to improve security. In that regard, blockchain 140 may be implemented using technologies such as, for example, Ethereum GETH, eth-lightwallet, or other suitable blockchain interface technologies.

Blockchain 140 may be maintained on various blockchain nodes 130 in the form of copies of the blockchain. Registration credentials may be added to blockchain 140 by establishing consensus between the nodes based on proof of work, proof of stake, practical byzantine fault tolerance, delegated proof of stake, or other suitable consensus algorithms.

The various electronic communications of system 100 including the registration and login requests, writing user credentials to blockchain 140, and/or reading data from blockchain 140 may be accomplished using a network 105. As used herein, the term "network" includes any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

In various embodiments, system 100 may use a Hierarchical Deterministic (HD) solution and may use BIP32, BIP39, and/or BIP44, for example, to generate an HD tree of public addresses. System 100 may include various computing devices configured to interact with blockchain 140 either via a blockchain client, such as GETH, or via API calls using a blockchain as a service provider, such as MICROSOFT AZURE® or Blockapps STRATO, for example. The various computing devices of system 100 may be configured to store registration credentials and execute smart contracts using blockchain 140 for data storage and/or validation. Smart contracts 135 may be completed by digital signature using asymmetric crypto operations and a private key, for example.

Referring now to FIGS. 2A-4B, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 2-4B, but also to the various system components as described above with reference to FIG. 1.

Figure 2A:
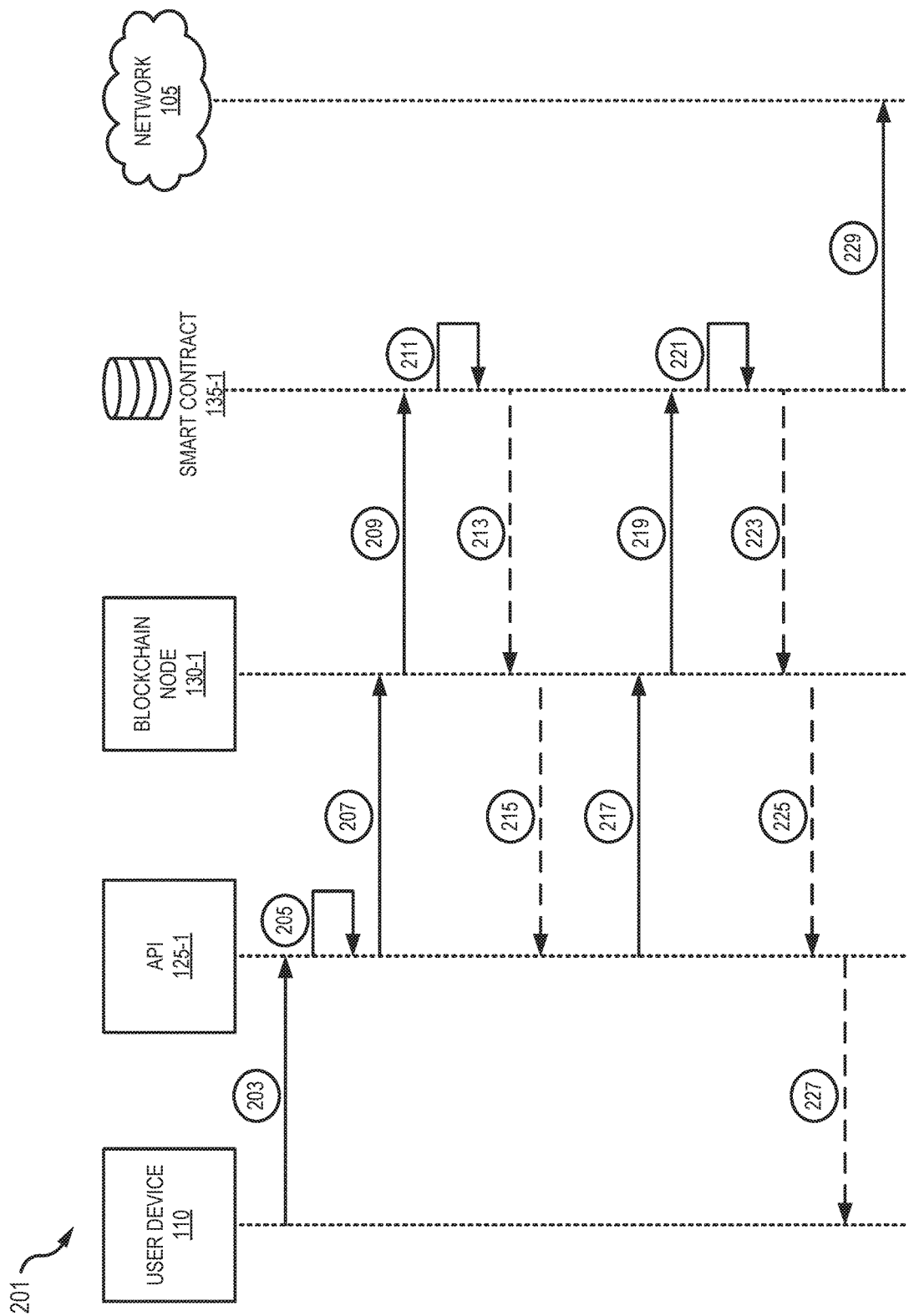
FIGS. 2A and 2B illustrate a process flow for single sign-on registration using blockchain, in accordance with various embodiments.
Figure 2B:
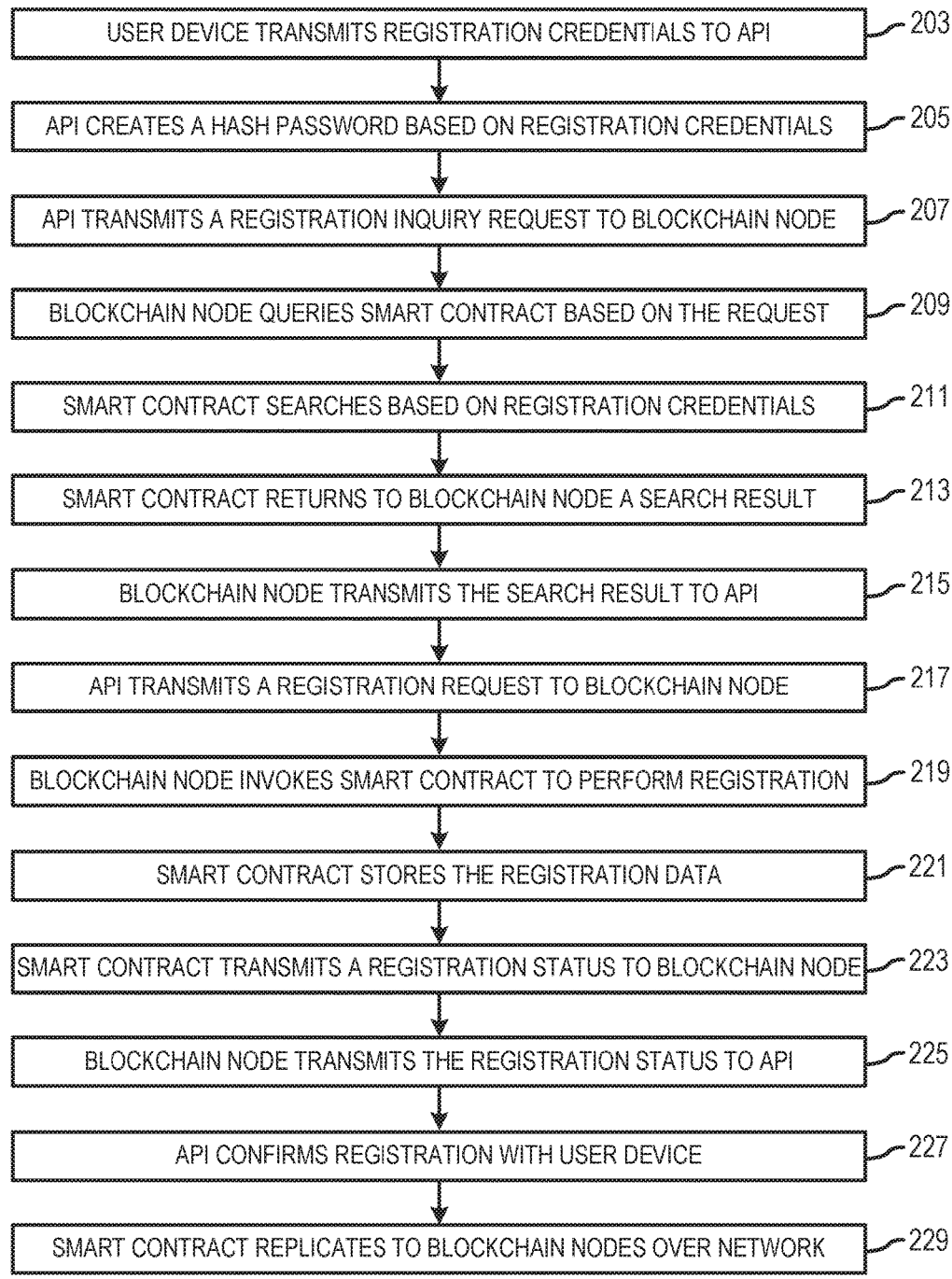

With specific reference to FIGS. 2A and 2B, and continued reference to FIG. 1, a single sign-on registration process 201 is shown according to various embodiments. Although the foregoing makes reference to interactions with API 125-1 (of first organization system 120-1), it should be understood that the following steps could be applied to interactions with any API corresponding to any suitable organization system 120, or other system in system 100. A user may interact with user device 110, via a mobile application, IoT, web browser, or the like, to transmit a registration request. For example, the user may desire to register for access to a software system, such as, for example first organization system 120-1. In that respect, user device 110 (via an application, browser, etc.) may engage API 125-1 to begin the registration process. In response, API 125-1 prompts user device 110 to transmit registration credentials. The registration credentials may comprise any suitable user identification, such as, for example, a user ID and password, a biometric input, or the like. User device 110 transmits registration credentials to API 125-1 (step 203). API 125-1 creates a hash password based on the registration credentials (step 205). The hash password may be based on the password received by the user device 110. The hash password may be taken using any cryptographic hash function such as, for example, SHA-1, SHA-256, checksum, or MD5. In various embodiments, the hash password might also be based on a biometric input from the registration credentials.

API 125-1 transmits a registration inquiry request to blockchain node 130-1 (step 207). The registration inquiry may comprise the registration credentials and the hash password. The registration inquiry may be transmitted according to a JSON-RPC protocol, and/or the like. Blockchain node 130-1 queries smart contract 135-1 based on the registration inquiry request (step 209). Blockchain node 130-1 may invoke and use smart contract 135-1 to begin a search based on the registration request, the hash password, or the like. Smart contract 135-1 searches based on the registration credentials (step 211). Smart contract 135-1 may search blockchain 140 to determine whether data matching the registration request, hash password, or the like is pre-existing in the system. Smart contract 135-1 returns to blockchain node 130-1 a search result (step 213). For example, in response to not locating any matching data, smart contract 135-1 may return a search result indicating that the registration credentials are not registered in the system. In response to locating matching data, smart contract 135-1 may return a search result indicating that the registration credentials were previously registered in the system. Blockchain node 130-1 transmits the search result to API 125-1 (step 215). API 125-1 transmits a registration request to blockchain node 130-1 (step 217).

Blockchain node 130-1 invokes and uses smart contract 135-1 to perform the registration (step 219). Blockchain node 130-1 may invoke and use smart contract 135-1 in response to the search result indicating that the registration credentials were not previously registered in the system. Smart contract 135-1 stores the registration data (step 221). For example, the registration data may comprise the user ID, the hash password, and/or the like. Smart contract 135-1 executes to write the registration data, via blockchain node 130-1, to blockchain 140 on blockchain node 130-1. Smart contract 135-1 may also update the stored data map in smart contract 135-1 to indicate the registration data. Smart contract 135-1 transmits a registration status to API 125-1 (step 223). The registration status may comprise data indicating whether the registration data was successfully written to the blockchain and/or smart contract 135-1. Blockchain node 130-1 transmits the registration status to API 125-1 (step 225). API 125-1 confirms registration with user device 110 (step 227). Smart contract 135-1 replicates the registration to blockchain nodes 130 over network 105 (step 229). Smart contract 135-1 may execute to propagate the registration data to the blockchain 140 of each blockchain node 130 over network 105, as discuss further herein.

Figure 3A:
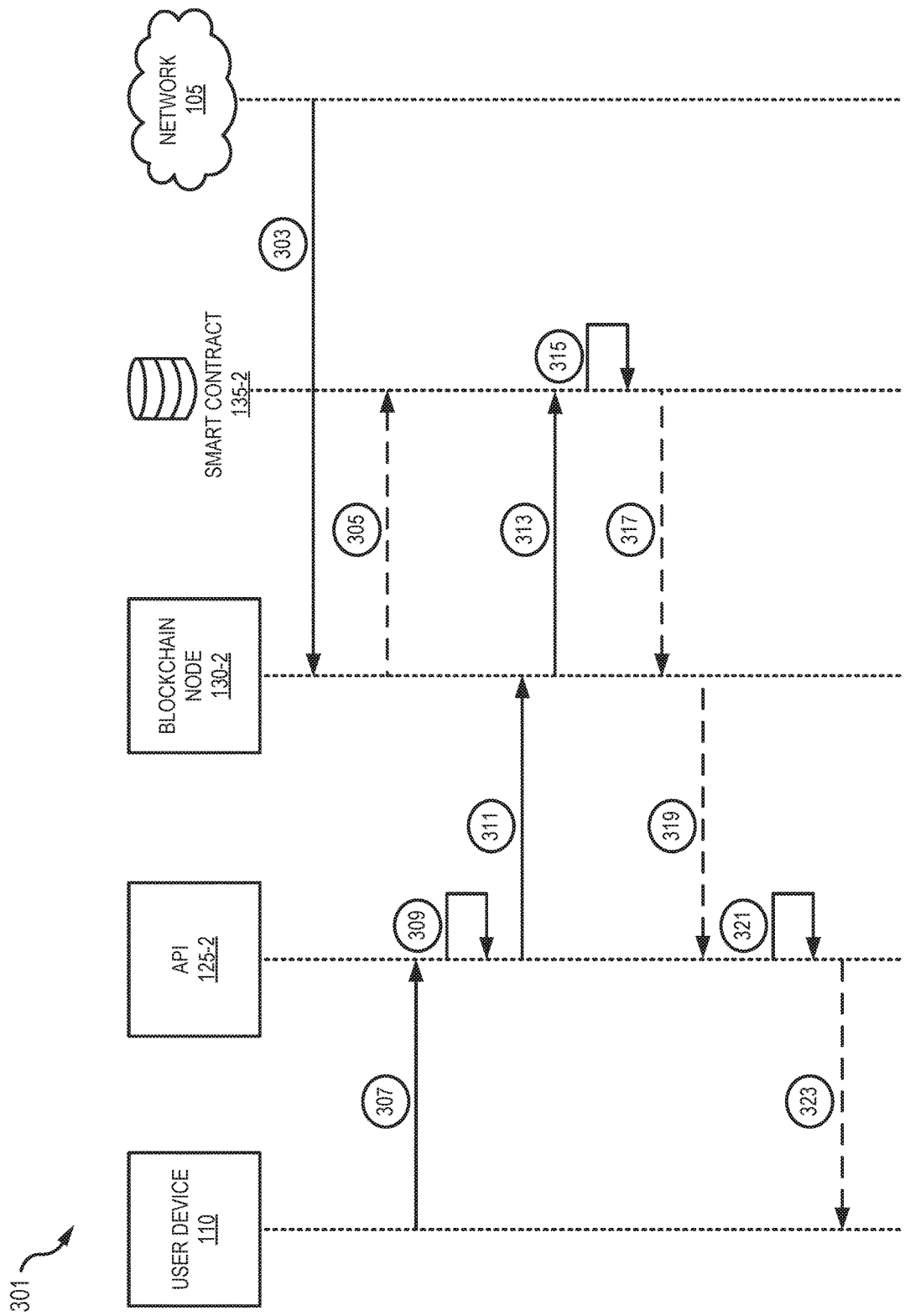
FIGS. 3A and 3B illustrate a process flow for a single sign-on login using blockchain, in accordance with various embodiments.
Figure 3B:
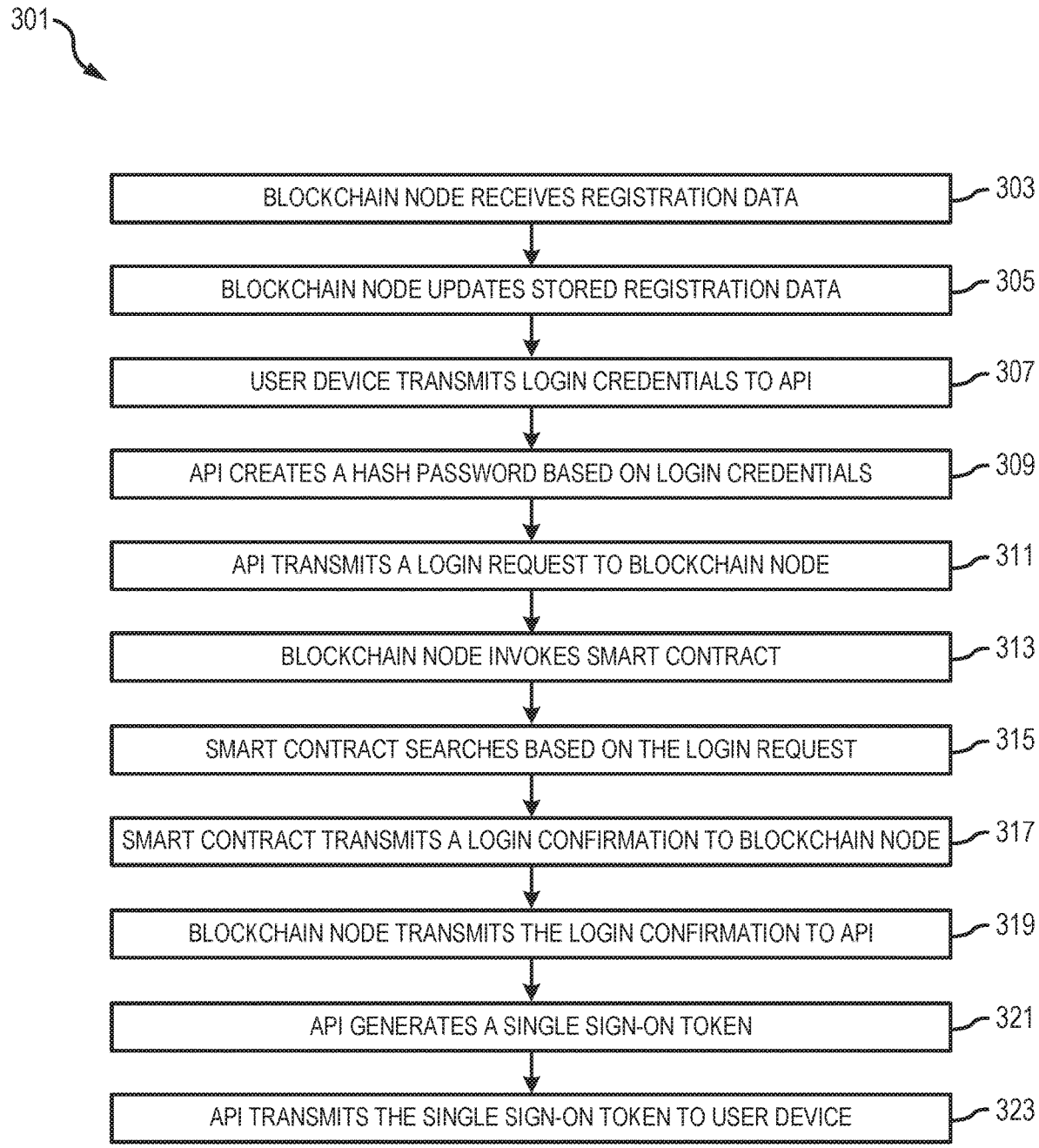

With specific reference to FIGS. 3A and 3B, and continued reference to FIG. 1, a single sign-on login process 301 is shown according to various embodiments. Although the foregoing makes reference to interactions with API 125-2 (of second organization system 120-2), it should be understood that the following steps could be applied to interactions with any API corresponding to any suitable organization system 120, or other system in system 100. Blockchain node 130-2 receives registration data (step 303). A secure peer-to-peer communication between blockchain nodes 130, via network 105, result in the propagation of data to the blockchain 140 stored in each blockchain node 130, including the registration data from step 229, with brief reference to FIGS. 2A and 2B. Blockchain node 130-2 updates stored registration data (step 305). For example, in response to receiving the propagated data (e.g., registration data) from network 105, blockchain node 130-2 may invoke and use smart contract 135-2 to write the registration data to the blockchain 140. Smart contract 135-2 may also update the stored data map in smart contract 135-2 to indicate the registration data.

User device 110 transmits login credentials to API 125-2 (step 307). A user may input the login credentials into user device 110 to access second organization system 120-2. The login credentials may comprise a user ID and password, a biometric input, or the like. API 125-2 creates a hash password based on the login credentials (step 309). The hash password may be generated similar to in step 205, with brief reference to FIGS. 2A and 2B. For example, the hash password may be based on the password from the login credentials. The hash password may be taken using any cryptographic hash function such as, for example, SHA-1, SHA-256, checksum, or MD5. In various embodiments, the hash password may also be based on a biometric input from the login credentials. API 125-2 transmits a login request to blockchain node 130-2 (step 311). The login request may comprise the login credentials and the hash password. The login request may be transmitted according to a JSON-RPC protocol, or via any other suitable remote procedure call protocol.

Blockchain node 130-2 invokes and uses smart contract 135-2 (step 313). Blockchain node 130-2 invokes and uses smart contract 135-2 to begin execution of various tasks based on the login request. Smart contract 135-2 searches based on the login request (step 315). Smart contract 135-2 may search blockchain 140 to determine whether data matching the login request exists. For example, smart contract 135-2 may search blockchain 140 to determine whether the user ID and hash password exist in blockchain 140 (and/or in the stored data map in smart contract 135-2). In response to locating data matching the login request (e.g., in response to determining that the user has registered in the system and the login credentials match the stored credentials), smart contract 135-2 may generate a login confirmation. The login confirmation may comprise data indicating a successful login, and may also comprise access restrictions or the like. Smart contract 135-2 transmits the login confirmation to blockchain node 130-2 (step 317). Blockchain node 130-2 transmits the login confirmation to API 125-2 (step 319).

API 125-2 generates a single sign-on token (step 321). API 125-2 may generate the single sign-on token in response to receiving the login confirmation indicating a successful login. The single sign-on token may comprise a web token, such as, for example, a JSON Web Token (JWT) and/or any other suitable web token. The single sign-on token may comprise one or more claims (e.g., attributes) indicating data such as the user ID, a token expiration time, access restrictions, or the like. The single sign-on token may also comprise data corresponding to user device 110, such as an IP address, MAC address, or other suitable identifier. The single sign-on token may also be digitally signed or encrypted, as discussed further herein. API 125-2 transmits the single sign-on token to user device 110 (step 323). User device 110, via a mobile application, IoT, web browser, or the like, may store the single sign-on token for access to one or more organization systems 120.

Figure 4B:
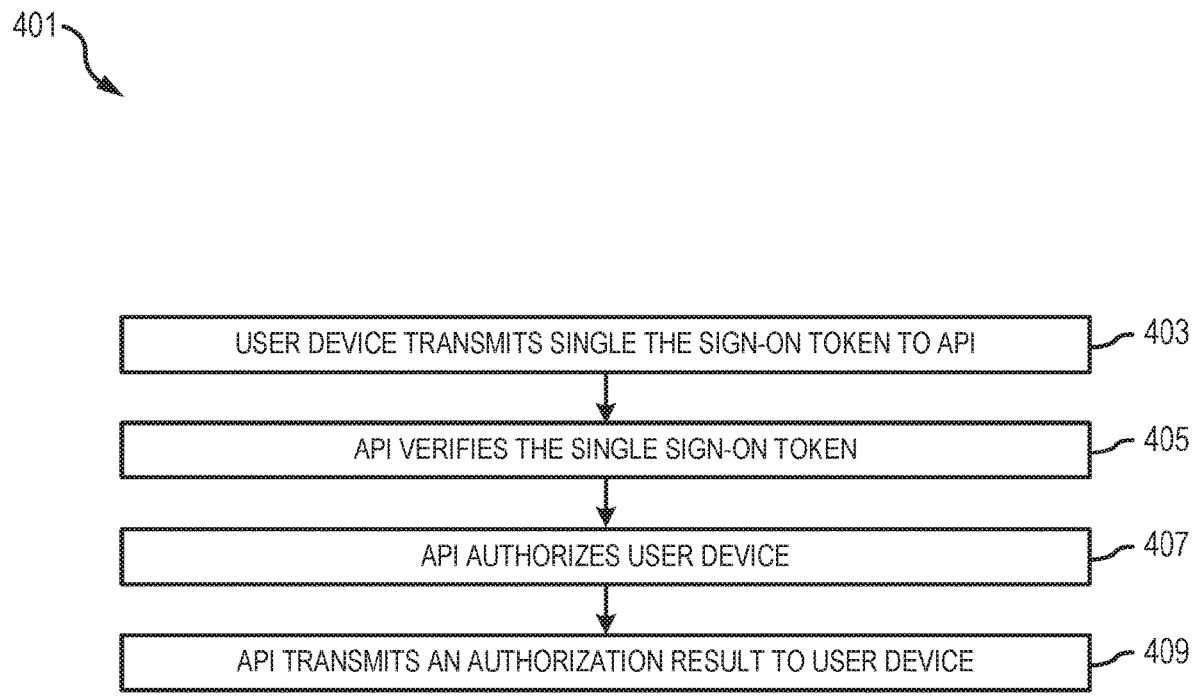

With specific reference to FIGS. 4A and 4B, and continued reference to FIG. 1, a process 401 for passing a single sign-on token is shown according to various embodiments. A user may access, via user device 110, one or more organization systems 120 using the single sign-on token generated in process 301, with brief reference to FIGS. 3A and 3B. Although the foregoing makes reference to interactions with API 125-2 (of second organization system 120-2), it should be understood that the following steps could be applied to allow user device 110 access to any suitable organization system 120, or other system in system 100, using the single sign-on token. For example, user device 110 may initiate a communication with API 125-2 to request access to second organization system 120-2. In response, API 125-2 may query user device 110 to transmit the single sign-on token or login credentials. User device 110 transmits the single sign-on token to API 125-2 (step 403).

API 125-2 verifies the single sign-on token (step 405). For example, API 125-2 may verify the single sign-on token by checking the digital signature to ensure the single sign-on token has not been tampered with, validating the claims (e.g., attributes), or the like.

For example, each user device 110 may previous be registered with an existing trust participant (e.g., identity provider), such as, for example, by being assigned a public key. Each smart contract 135 may store a mapping of public keys comprising each user device 110, the public key, and/or any other suitable attribute. Each API 125 may store the private key associated with the public keys, and during generation of the single sign-on token (e.g., step 321, with brief reference to FIG. 3) may digitally sign or encrypt the sign-sign on token using the private key. During the verification process of step 405, API 125-2 may query smart contract 135-2 based on the user device 110 to determine the public key assigned to the device. API 125-2 may verify the single sign-on token by verifying the digital signature using the public key.

API 125-2 authorizes user device 110 (step 407). API 125-2 may authenticate and authorize user device 110 for access to second organization system 120 by reviewing the claims from the single sign-on token. For example, the single sign-on token may comprise data indicating systems that the user are authorized and/or non-authorized to visit. API 125-2 may determine whether the user, via user device 110, is authorized to view data or other access second organization 120-2. API 125-2 transmits an authorization result to user device 110 (step 409). In response to a successful authorization, user device 110 may display via the app, browser, or the like that the user was successfully logged in, and/or may redirect the user to a webpage or the like to grant access to second organization system 120-2.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A distributed computing cluster and/or big data management system may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, messages, information, metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK® message, TWITTER® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a magnetic tape drive, an optical disk drive, etc. The removable storage drive reads from and/or writes to a removable storage unit in a well-known manner. Removable storage unit represents a magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The computer system or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, JBOSS®, EDB® Postgres Plus Advanced Server® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE®

IOS®, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® ACCESS® or MICROSOFT® SQL Server® by MICROSOFT® Corporation (Redmond, Wash.), MYSQL® by MySQL AB (Uppsala, Sweden), HBas by APACHE®, MapR-DB, or any other suitable database product. Moreover, the databases may be organized in any suitable manner, for example, as data tables or lookup tables. Each record may be a single file, a series of files, a linked series of data fields, or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, and U.S. application Ser. No. 15/728,086 titled SYSTEMS AND METHODS FOR LOYALTY POINT DISTRIBUTION and filed Oct. 9, 2017, the contents of which are each incorporated by reference in their entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as MICROSOFT® ACCESS® or MICROSOFT® SQL Server, ORACLE®, SYBASE®, INFORMIX® MySQL, INTERBASE®, etc., may be used to provide an Active Data Object (ADO) compliant database management system. In one embodiment, the Apache web server is used in conjunction with a Linux operating system, a MYSQL® database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems.

Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, APACHE® Hive, JAVA®, JAVASCRIPT®, VBScript, Macromedia Cold Fusion, COBOL, MICROSOFT® Active Server Pages, assembly, PERL, PHP, awk, Python, Visual Basic, SQL Stored Procedures, Spark, Scala, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3A-4B, the process flows and screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS' but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of validating and logging API transactions, but the disclosure and claims include specific rules for implementing the outcome of validating and logging API transactions and that render information into a specific format that is then used and applied to create the desired results of validating and logging API transactions, as set forth in *McRO, Inc. v. Bandai Namco Games America Inc.* (Fed. Cir. case number 15-1080, Sep. 13, 2016). In other words, the outcome of validating and logging API transactions can be performed by many different types of rules and combinations of rules, and this disclosure includes various embodiments with specific rules. While the absence of complete preemption may not guarantee that a claim is eligible, the disclosure does not sufficiently preempt the field of validating and logging API transactions at all. The disclosure acts to narrow, confine, and otherwise tie down the disclosure so as not to cover the general abstract idea of just validating and logging API transactions. Significantly, other systems and methods exist for validating and logging API transactions, so it would be inappropriate to assert that the claimed invention preempts the field or monopolizes the basic tools of validating and logging API transactions. In other words, the disclosure will not prevent others from validating and logging API transactions, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computers ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email, out-of-balance alerts, etc.) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants: and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A system, comprising:
    at least one computing device comprising a processor and a memory; and
    machine-readable instructions stored in the memory that when executed by the processor, cause the at least one computing device to at least:
        receive login credentials from a client device;
        generate a password hash associated with the login credentials;
        transmit a login request comprising the login credentials and the password hash to a node of a distributed ledger;
        receive a login confirmation from the node associated with the distributed ledger in response the login credentials matching registration data stored on the distributed ledger;
        generate a single sign-on (SSO) token in response to receiving the login confirmation; and
        transmit the SSO token to the client device.

2. The system of claim 1, wherein, when executed, the machine-readable instructions further cause the at least one computing device to at least:
    receive, in response to an application programming interface (API) call by the client device, a registration request comprising the registration data; and
    cause the registration data to be written to the distributed ledger.

3. The system of claim 1, wherein the node comprises a first node of a plurality of nodes of the distributed ledger, the plurality of nodes storing data according to a consensus agreement among the plurality of nodes.

4. The system of claim 1, wherein the password hash is used by the node of the distributed ledger to locate the stored registration data.

5. The system of claim 1, wherein the SSO token is generated to allow access by the client device to a plurality of services associated with an organization.

6. The system of claim 1, wherein the SSO token comprises a user identifier, a token expiation time, client device data, and one or more access restrictions.

7. The system of claim 1, wherein, when executed by the processor, the machine-readable instructions cause the at least one computing device to at least encrypt the SSO token using a private key of a key-pair associated with the client device, a public key of the key-pair being stored on the distributed ledger.

8. The system of claim 1, wherein the password hash is generated using a cryptographic hash function.

9. A system, comprising:
    a distributed ledger comprising a plurality of nodes that store data according to a consensus agreement among the plurality of nodes; and
    at least one application executable on at least one node of the plurality of nodes, wherein, when executed, the at least one application causes the at least one node to at least:
        receive login request from a first computing device, the login request comprising a password hash and login credentials associated with a user interacting with a second computing device;
        execute a smart contract to determine whether the login credentials match registration credentials stored on the distributed ledger;
        generate a login confirmation in response to the login credentials matching the registration credentials; and
        transmit the login confirmation to the first computing device, wherein the first computing device generates a single sign-on (SSO) token for the second computing device in response to receiving the login confirmation.

10. The system of claim 9, wherein the login credentials comprise a biometric input.

11. The system of claim 9, wherein the SSO token is encrypted using a private key of a key-pair associated with the second computing device.

12. The system of claim 11, wherein, when executed by the at least one node, the at least one application causes the at least one node to at least store a public key of the key-pair associated with the second computing device in the distributed ledger, the SSO token is decrypted using the public key.

13. The system of claim 9, wherein, when executed by the at least one node, the at least one application causes the at least one node to at least identify the stored registration credentials on the distributed ledger based at least in part on the password hash.

14. The system of claim 9, wherein, when executed by the at least one node, the at least one application causes the at least one node to at least receive a registration request to record the registration credentials on the distributed ledger, wherein, when executed, the smart contract:
    determines that the registration credentials fail to exist on the distributed ledger; and
    writes the registration credentials to the distributed ledger by distributing the registration credentials to at least one other node of the plurality of nodes in response to determining that the registration credentials fail to exist on the distributed ledger.

15. A method, comprising:

receiving login credentials from a computing device;

generating a password hash based at least in part on the login credentials and a cryptographic hash function;

verifying that the login credentials are valid by determining that the login credentials match registration credentials stored on a distributed ledger, the registration credentials being identified on the distributed ledger based at least in part on the password hash;

generating a single sign-on (SSO) token for the computing device in response to verifying the login credentials are valid, the SSO token being generated to allow access by the computing device to a plurality of systems associated with an organization; and transmitting the SSO token to the computing device.

16. The method of claim 15, further comprising:

receiving an access request from the computing device, the access request comprising the SSO token; and authenticating the computing device based at least in part on the SSO token.

17. The method of claim 16, further comprising:

accessing a public key associated with the computing device, the public key being stored on the distributed ledger; and decrypting the SSO token using the public key.

18. The method of claim 15, wherein the password hash comprises a login password hash, and further comprising:

receiving a registration request via an application programming interface (API) call from the computing device;

creating a registration password hash based at least in part on the registration credentials included in the registration request; and causing the registration credentials to be written to the distributed ledger in association with the registration password hash.

19. The method of claim 18, wherein the login password hash matches the registration password hash.

20. The method of claim 18, wherein the registration credentials are written to the distributed ledger in response to a consensus agreement among a plurality of nodes associated with the distributed ledger.

* * * * *